(12) United States Patent
Shi

(10) Patent No.: US 10,347,216 B2
(45) Date of Patent: Jul. 9, 2019

(54) HEAD MOUNTED DISPLAY DEVICE

(71) Applicant: SHENZHEN ROYOLE TECHNOLOGIES CO. LTD., Shenzhen, Guangdong (CN)

(72) Inventor: Hongyan Shi, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/751,415

(22) PCT Filed: Dec. 30, 2015

(86) PCT No.: PCT/CN2015/099997
§ 371 (c)(1),
(2) Date: Feb. 8, 2018

(87) PCT Pub. No.: WO2017/113255
PCT Pub. Date: Jul. 6, 2017

(65) Prior Publication Data
US 2018/0233110 A1 Aug. 16, 2018

Related U.S. Application Data

(63) Continuation of application No. PCT/CN2015/099997, filed on Dec. 30, 2015.

(51) Int. Cl.
G02B 27/01 (2006.01)
G02B 23/10 (2006.01)
(Continued)

(52) U.S. Cl.
CPC .............. G09G 5/12 (2013.01); G02B 5/08 (2013.01); G02B 7/182 (2013.01);
(Continued)

(58) Field of Classification Search
CPC .... G02B 27/0172; G02B 27/14; G02B 7/182; G02B 27/017; G02B 23/10
See application file for complete search history.

(56) References Cited

U.S. PATENT DOCUMENTS

2006/0098293 A1   5/2006   Garoutte et al.

FOREIGN PATENT DOCUMENTS

CN   203275755 U   11/2013
CN   204595329 U   8/2015
(Continued)

OTHER PUBLICATIONS

Song et al.; CN 104898276; dated Sep. 9, 2015; Machine Translation in English (Year: 2015).*
(Continued)

Primary Examiner — Ryan D Howard
(74) Attorney, Agent, or Firm — Hauptman Ham, LLP

(57) ABSTRACT

The disclosure provides a head mounted display device, comprising a house and an optical glass, a telescope, an imaging lens assembly and a display screen located in the house. The house further comprises a display window and a view window. The telescope is located corresponding to the view window. The optical glass and the telescope are collocated along a first optical axis. The imaging lens assembly and the display screen are collocated along a second optical axis. Light emitted by the display screen passes through the imaging lens assembly and the optical glass and projects out the house through the display window. Or, light of outside world passes through the view window and the telescope and projects out the house through the display window. User can watch outside scenes through the head mounted display device.

12 Claims, 3 Drawing Sheets

(51) Int. Cl.
  *G09G 5/12*    (2006.01)
  *G02B 5/08*    (2006.01)
  *G02B 7/182*   (2006.01)
  *G02B 27/14*   (2006.01)
  *G02B 27/00*   (2006.01)
(52) U.S. Cl.
  CPC ......... *G02B 27/0172* (2013.01); *G02B 27/14* (2013.01); *G02B 23/10* (2013.01); *G02B 27/0006* (2013.01); *G02B 27/0018* (2013.01); *G02B 2027/012* (2013.01)

(56) References Cited

FOREIGN PATENT DOCUMENTS

CN  104898276 A   9/2015
WO  2013146654 A1  10/2013

OTHER PUBLICATIONS

Jia, Huaichang; CN 203275755 U; dated Nov. 6, 2013; Machine Translation in English (Year: 2013).*
International search report issued in corresponding international application No. PCT/CN2015/099997 dated Oct. 9, 2016.

* cited by examiner

HEAD MOUNTED DISPLAY DEVICE

RELATED APPLICATIONS

The present application is a National Phase of International Application Number PCT/CN2015/099997, filed Dec. 30, 2015.

TECHNICAL FIELD

This disclosure relates to a head mounted displaying field, and more particularly relates to a head mounted display device.

BACKGROUND

Head mounted display device (hereinafter "HMD") is a display device which can be worn over a head. HMD generally employs a "near-eye optical system" to project a display source of a display screen into eyes of a user. HMD is divided into an immersion and a penetration. For an immersive device, it allows the user to fully immersing the display content provided by the device, which isolates the user from a contact with a real world.

In order to solve the problem that the immersive HMD isolates the user from the contact with the real world, a current general way is to set an external camera on the HMD. The user can switch the external camera as an output display source and display external scenes captured by the camera through the HMD. However, the switch of the external camera may generate some certain time delay and some location offset, which leads to a difference between the external scene displayed by the HMD and the real scene, resulting unreality.

SUMMARY

Embodiments of the invention provide a head mounted display device, to provide a solution of really viewing the outside scenes.

Embodiments of the invention, in a first aspect, provide a head mounted display device, comprising a house and an optical glass, a telescope, an imaging lens assembly and a display screen arranged in the house. The house further comprises a display window and a view window. The telescope is arranged corresponding to the view window. The optical glass and the telescope are collocated along a first optical axis. The imaging lens assembly and the display screen are collocated along a second optical axis. Therein, light emitted by the display screen passes through the imaging lens assembly and the optical glass and projects out the house through the display window, or outside light passes through the view window and the telescope and projects out the house through the display window.

In the head mounted display device disclosed by the invention, the light emitted by the display screen passes through the imaging lens assembly, and the optical glass and projects outside of the house through the display window, to provide displaying content for the user watching; or the outside light passes through the view window, and the telescope and projects outside of the house through the display window, to provide the outside scenes for the user watching through the head mounted display device.

BRIEF DESCRIPTION OF THE ACCOMPANYING DRAWINGS

To describe the technology solutions of the embodiments of the present invention or of the prior art more clearly, the following introduces the accompanying drawings required for described in the embodiments or in the prior art briefly. Obviously, the accompanying drawings in the following description merely show some embodiments of the present invention. For those skilled in the art, other drawings may be obtained based on these drawings without any creative work.

DETAILED DESCRIPTION OF ILLUSTRATED EMBODIMENTS

Figure 1:
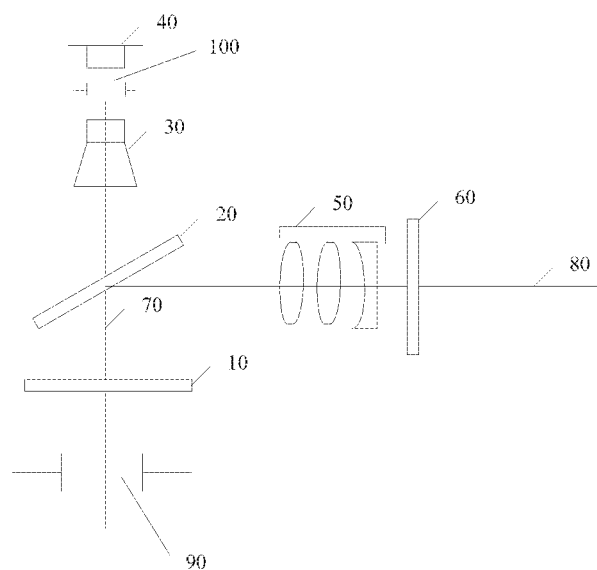
FIG. 1 is a schematic structural diagram of an embodiment of the present invention of optical elements of a head mounted display device.

The embodiment of the present invention provides a head mounted display device, which provides a solution of really viewing the outside scene.

In order to enable those skilled in the art to better understand the solutions of the present invention, the technical solutions in the embodiments of the present invention are clearly and completely described with reference to the accompanying drawings in the embodiments of the present invention. Obviously, the described embodiments are merely some embodiments of a part of the present invention, rather than all of the embodiments. All the other embodiments obtained by a person of ordinary skilled in the art based on the embodiments of the present invention without creative efforts shall fall within the protection scope of the present invention.

The detailed description shows as follows.

The terms "first", "second", "third", and "fourth" in the description and claims of the present invention and the drawings are used to distinguish different objects, rather than to describe a specific order.

Referring to FIGS. 1 to 6 together, the present invention provides a head mounted display device which includes a house 1, and an optical glass 20, a telescope 30, an imaging lens assembly 50 and a display screen 60 located in the house 1. The house 1 further includes a display window 90 and a view window 100. The telescope 30 is arranged corresponding to the view window 100. The optical glass 20 and the telescope 30 are collocated along a first optical axis 70. The imaging lens assembly 50 and the display screen 60 are collocated along a second optical axis 80. Therein, the light emitted by the display screen 60 passes through the imaging lens assembly 50 and the optical glass 20 and projects outside of the house 1 through the display window 90. When the user wears the head mounted display device, two eyes of the user respectively correspond to the two display windows 90, that is, the light emitted by the display screen 60 passes through the imaging lens assembly 50 and the optical glass 20 and projects into the two eyes of the user through the display window 90. Or, the outside light passes through the view window 100 and the telescope 30 and projects outside of the house 1 through the display window 90, thus, the user can watch the outside scenes.

It is important to note that, the present invention discloses the head mounted display device including two optical systems, one of the two optical systems is corresponding to the left eye, and the other of the two optical systems is corresponding to the right eye, and the two optical systems are arranged with respective to each other. FIGS. 1 and 2 and FIGS. 5 and 6 are schematic diagrams of optical elements of any one optical system of the head mounted display device disclosed by the present invention.

Optionally, the head mounted display device provided by the present invention includes two shielding cases 40 each of which shields one view window 100 and/or two cover lens 10 each of which covers one display window 90. In the embodiment of the present invention, the view windows 100 and the display windows 90 can be holes defined in the house 1, the light ray can pass in and out. The shielding case 40 is movably disposed on the house 1 at a position corresponding to the view window 100 so that the shielding case 40 is in a closed state when viewing the display content of the display screen 60. In detail, the shielding case 40 is made of opaque materials, that is, the shielding case 40 can prevent the outside light ray from passing in the telescope 30. Under this way, when the display content of the display screen 60 is watched, a better immersive experience may be achieved. When it is necessary to watch the outside scenes, the shielding case 40 is in an open state, that is, the outside light can pass into the telescope 30. The cover lens 10 can be fixed to the display window 90. The cover lens 10 can prevent the outside dust from entering into the house 1 and affecting the optical elements and rendering effect of the optical elements.

Optionally, the telescope 30 can be disassembled and replaced. In detail, the telescope 30 can be arranged in the house 1 through the buckle structure.

In an actual implementation, since the view window 100 arranged in the house 1 takes up a certain width, a view field that the eye watches the real environment through the view window 100 is limited, in order to increase the view field of watching the real environment, the telescope 30 which has a certain magnification is arranged before the optical glass 20 and the telescope 30 is inverted. That is, the eyepiece 31 of each telescope 30 is arranged corresponding to one view window 100. The outside light passes through the eyepiece 31 of the telescope 30 and further passes through an objective lens 32 and then projects out. The inverted telescope 30 can zoom out the object, and the view field zooms in, therefore, the telescope 30 with a certain magnification is inverted before the optical glass 20 which can thus increase the view field of watching the realistic environment. As the telescope 30 can be disassembled and replaced, the inverted telescope 30 having different magnifications can be replaced according to user's need, which can enhance user experiences.

Optionally, the angle between the optical glass 20 and the second optical axis 80 is 45°.

Optionally, the angle between the first optical axis 70 and the second optical axis 80 is 90°.

Optionally, the optical glass 20 is a total reflection glass.

In this embodiment, each view window 100 faces one display window 90 directly, which causes the user to watch the view facing the eyes. More optimally, the optical glass 20 is coupled to the optical shutter 200. When the optical shutter 200 is in a pop-up state, the optical glass 20 is removed from the first optical axis 70, such that the outside light passed through the telescope 30 can project out the display window 90 directly, for the user watching. When the optical shutter 200 is in a pop-down state, the optical glass 20 moves into the first optical axis 70, such that the light emitted by the display screen 60 is reflected by the imaging lens assembly 50 and the optical glass 20, and further projected to a direction of the display window 90, and thus projected into the eyes of the user. Therein, the optical shutter 200 is coupled to a controller of the head mounted display device, so that the controller obtains the operations of the user activating the optical shutter 200 according to the input unit. For example, the input unit can be physical buttons, a touch pad, or the like, and configured to achieve to control the operation of up and down of the optical shutter 200. The optical shutter 200 can be also coupled to an operable component leading to outside of the house 1, such that the user can manually operate the operable component so as to drive the optical shutter 200 up or down. It's understandable that attached drawings are used for illustrating the principle of the present invention, but not limited to the specific structural location of the attached drawings. The display screen 60 can be arranged at any locations, as long as the specific light design is satisfied, and the light emitted by the display screen 60 can project into the user's eyes through the display windows 90 according to a designed optical path. Similarly, the view windows 100 and the correspondingly telescopes 30 can be but not limited to locate on the locations facing the display window 90 directly, such as arranged on the side of the house 1, the optical path can be changed through the specific light design to achieve projecting to the user's eyes through the display windows 90, for example, the optical path can be changed by adopting a reflecting element, such that an emergent direction is achieved.

The surface 21 of the optical glass 20 close to the imaging lens assembly 50 is coated with a visible spectrum total reflection film. The surface 22 of the optical glass 20 away from the imaging lens assembly 50 is a matte surface.

Therein, the visible spectrum total reflection film totally reflects the visible spectrum having a wave length of 380 nm-780 nm. The total reflection film can be an all-dielectric reflection film or a metal reflection film. The all-dielectric reflection film is a plated film made of non-metallic compounds materials. The metal reflection film is a plated film made of metallic materials.

Figure 2:
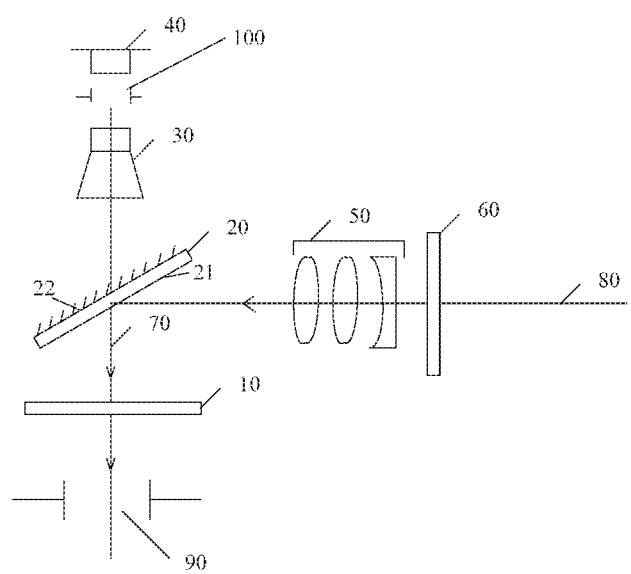
FIG. 2 is a schematic structural diagram of another embodiment of the present invention of optical elements of the head mounted display device.
Figure 3:
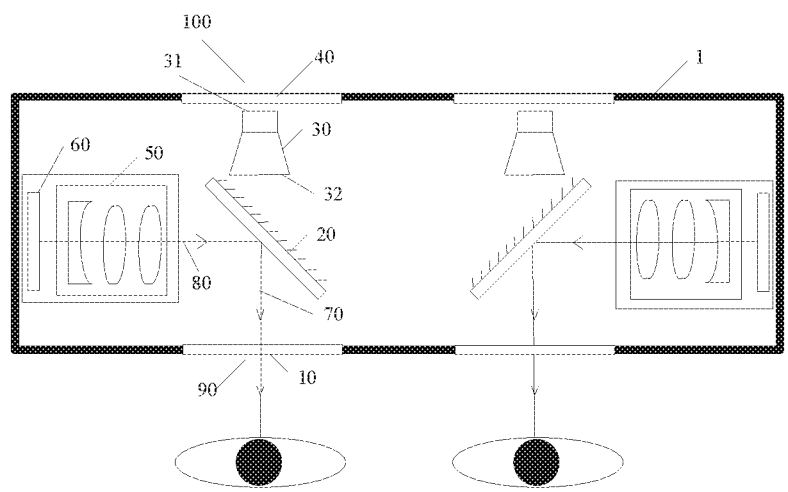
FIG. 3 is a principle schematic diagram of an embodiment of the present invention of displaying content on the head mounted display device.
Figure 4:
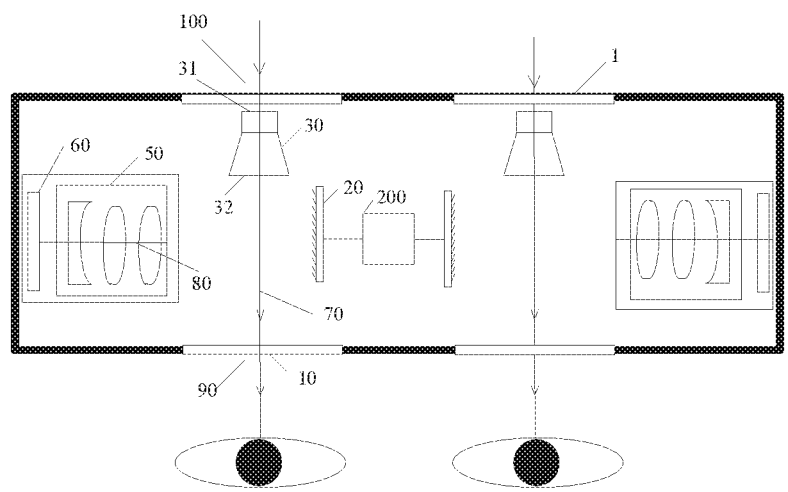
FIG. 4 is a principle schematic diagram of an embodiment of the present invention of watching outside scenes in the head mounted display device.

For example, as shown in FIGS. 2 to 4, when the shielding case 40 is in a closed state, that is, the shielding case 40 shields the outside light ray from passing in the telescope 30. Under this way, when the display content of the display screen 60 is watched, a better immersive experience may be achieved. When the display screen 60 is in an open state, the light emitted by the display screen 60 passes through the imaging lens assembly 50 and is reflected by the surface 21 of the optical glass 20 close to the imaging lens assembly 50. Because the surface 21 of the optical glass 20 close to the imaging lens assembly 50 is coated with the visible spectrum total reflection film, so the light emitted by the display screen 60 is mostly reflected by the optical glass 20 and projects to the display window 90, and the remaining part of the minority light ray irradiates the surface 22 of the optical glass 20 away from the imaging lens assembly 50 through the reflected film, as the surface 22 of the optical glass 20 away from the imaging lens assembly 50 is the matte surface, so the remaining part of the minority light ray forms a diffuse reflection on the surface 22 of the optical glass 20 away from the imaging lens assembly 50, the specular reflection can be avoided, and the ghosting phenomenon can be further avoided. When the shielding case 40 is in the open state, and the display screen 60 is in the closed state, the outside light passes through the telescope 30 and passes into the optical glass 20, because the surface 22 of the optical glass 20 away from the imaging lens assembly 50 is the matter surface, and the surface 21 of the optical glass 20 close to the imaging lens assembly 50 is coated with the visible spectrum total reflection film, the outside light passes through the view window 100 and the telephone 30, and is further reflected by the surface 22 of the optical glass 20, the outside light cannot project out of the house 1 through the display window 90, therefore, the head mounted display device shown in FIG. 2 is used for watching the outside scenes, the optical glass 20 can be removed to the location shown in the FIG. 4 through the optical shutter 200, or the optical glass 20 is removed to other locations which are not in the first optical axis 70, as long as the outside light cannot be avoided from projecting the outside world through the display window 90, which are not limited in the present invention.

Optionally, the optical glass 20 is a beam splitter.

Optionally, the surface 21 of the optical glass 20 close to the imaging lens assembly 50 is coated with the spectroscopic film which has a reflection of 50% of visible spectrum and a transmission of another 50% of the visible spectrum. The surface 22 of the optical glass 20 away from the imaging lens assembly 50 is coated with the visible spectrum anti-reflection film.

Therein, when the light irradiates the spectroscopic film which has the reflection of 50% of visible spectrum and the transmission of another 50% of visible spectrum at a 45 degree angle of incidence, the visible spectrum which has a wave length of 380 nm~780 nm is reflected by 50% of the visible spectrum and transmitted by another 50% of the visible spectrum. The spectroscopic film which has the reflection of 50% of visible spectrum and the transmission of another 50% of visible spectrum is an all-dielectric spectroscopic film.

Figure 5:
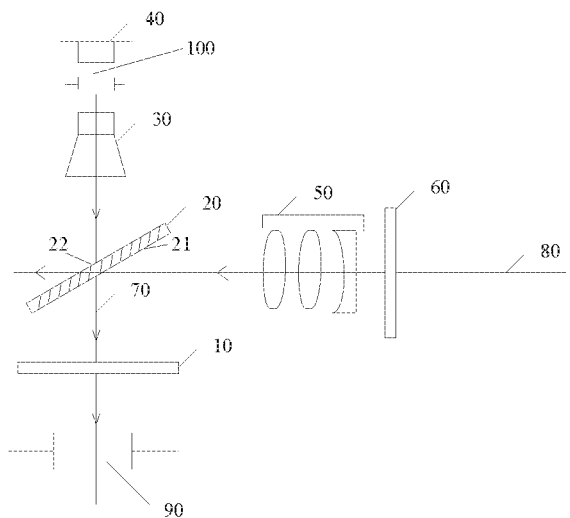
FIG. 5 is a schematic structural diagram of another embodiment of the present invention of optical components of the head mounted display device.

For example, as shown in FIG. 5, when the shielding case 40 is in the closed state, and the display screen 60 is in the open state, after the light emitted by the display screen 60 passes through the imaging lens assembly 50, and in the surface 21 of the optical glass 20 close to the imaging lens assembly 50, 50% of the light is reflected by the spectroscopic film coated on the surface 21, and is projected to the human eyes, the remaining 50% of the light irradiates from air into the optical glass 20 through the spectroscopic film coated on the surface 21 of the optical glass 20 so that a refraction is formed. Because the surface 22 of the optical glass 20 is coated with the visible spectrum antireflection film, so the remaining 50% of the light is not reflected by the surface 21 of the optical glass 20, but transmitted out from the surface 22 of the optical glass 20. When the shielding case 40 is in the open state, and the display screen 60 is in the closed state, the outside light passes through the telescope 30 and passes into the optical glass 20, because the surface 21 of the optical glass 20 close to the imaging lens assembly 50 is coated with the spectroscopic film which has the reflection of 50% of visible spectrum and the transmission of another 50% of the visible spectrum, and the surface 22 of the optical glass 20 away from the imaging lens assembly 50 is coated with the visible spectrum antireflection film, therefore, 50% of the light passing in the optical glass 20 passes through the first lens 10 and projects into the human eyes, the optical glass 20 is not needed to be removed from the first optical axis 70. Therefore, when the outside scenes are watched using the head mounted display device shown in FIG. 5, only the shielding case 40 is needed to be opened, which simplifies the operation.

Optionally, the optical glass 20 is a polarized beam splitter.

Figure 6:
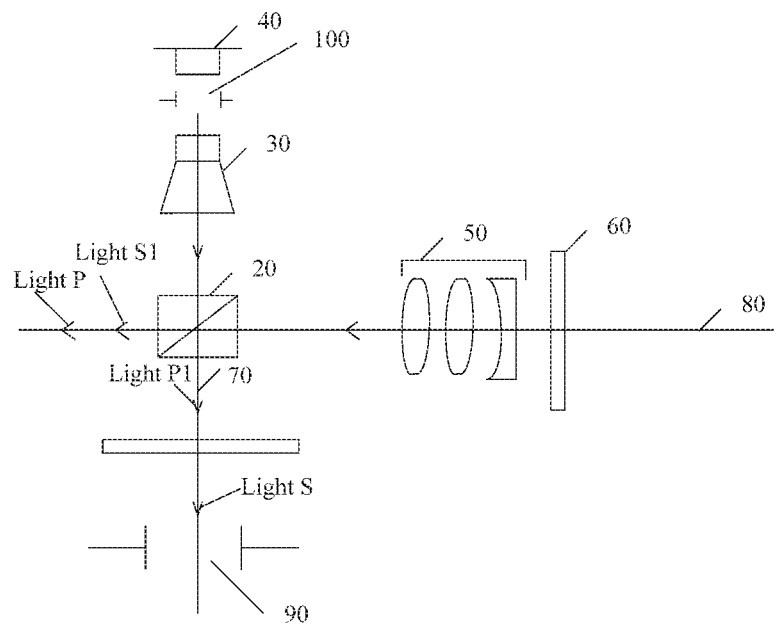
FIG. 6 is a schematic structural diagram of another embodiment of the present invention of optical components of the head mounted display device.

For example, as shown in FIG. 6, when the shielding case 40 is in the closed state, and the display screen 60 is in the open state, the light emitted by the display screen 60 passes through the imaging lens assembly 50 and is divided into a beam of light S vertical to the second optical axis 80 and a beam of light P parallel to the second optical axis 80. The light S passes through the first lens 10 and projects into the human eyes. The light P transmits out through the optical glass 20. When the shielding case 40 is in the open state, and the display screen 60 is in the closed state, the outside light passes through the telescope 30 and passes into the optical glass 20, and is divided into a beam of light S1 vertical to the second optical axis 80 and a beam of light P1 parallel to the second optical axis 80. The light P1 passes through the first lens 10 and projects into the human eyes. The light S1 transmits out through the optical glass 20. Therefore, the optical glass 20 is not needed to be removed from the first optical axis 70. Therefore, when the head mounted display device shown in FIG. 6 watches the outside scenes, only the shielding 40 case is needed to be opened, which simplifies the operation.

It is observed that, in the head mounted display device disclosed in the present invention, when the shielding case 40 is in the closed state, and the display screen 60 is in the open state, the light emitted by the display screen 60 passes through the imaging lens assembly 50 and the optical glass 20 and further projects out the house 1 through the display window 90. When the shielding case 40 is in the open state, and the display screen 60 is in the closed state, the external light passes through the view window 100, the telescope 30 and the optical lens 20, and projects out of the house 1 through the display window 90. Or, when the shielding case 40 is in the open state, the display screen 60 is in the closed state, and the optical glass 20 is in a removing state, the outside light passes through the view window 100 and the telescope 30 and projects out the house 1 through the display window 90. It is thus obvious that, when the outside scenes need to be watched, only the shielding case 40 is opened, the display 60 is closed, or the shielding case 40 is opened, the display 60 is closed, and the optical glass 20 is removed, the outside scenes can be seen. In comparison with the external camera of the prior art, when it is switched from the virtual image display to the real image display, the time difference between the imaging display and the real display switching is reduced, so as to enhance the realism.

The foregoing description merely depicts some exemplary embodiments of the disclosure and thus is not intended as limiting the scope of the disclosure. Any variations or substitutions that can be readily thought of by a person skilled in the art shall all be covered within the protection of the disclosure in light of the scope of the disclosure. Therefore, the scope of the disclosure is defined only by the appended claims.

What is claimed is:

1. A head mounted display device, comprising a house and an optical glass, a telescope, an imaging lens assembly and a display screen arranged in the house, wherein, the house further comprises a display window and a view window, the telescope is arranged corresponding to the view window; the optical glass and the telescope are collocated along a first optical axis, the imaging lens assembly and the display screen are collocated along a second optical axis;

light emitted by the display screen passes through the imaging lens assembly and the optical glass, and projects out the house through the display window; or outside light passes through the view window and the telescope, and projects out the house through the display window; the optical glass is a total reflection glass.

2. The head mounted display device according to claim 1, wherein, the optical glass is coupled to an optical shutter, when the optical shutter is in a pop-up state, the optical glass is removed from the first optical axis; when the optical shutter is in a pop-down state, the optical glass is arranged in the first optical axis.

3. The head mounted display device according to claim 2, wherein, a surface of the optical glass close to the imaging lens assembly is coated with a visible spectrum total reflection film, a surface of the optical glass away from the imaging lens assembly is a matte surface.

4. The head mounted display device according to claim 1, wherein, an angle between the optical glass and the second optical axis is 45°.

5. The head mounted display device according to claim 1, wherein, an angle between the first optical axis and the second optical axis is 90°.

6. The head mounted display device according to claim 1, wherein, an eyepiece of each telescope is arranged corresponding to one view window, outside light passes through the eyepiece of the telescope and passes through an objective lens and then projects out.

7. The head mounted display device according to claim 1, further comprises a shielding case shielding the view window, or a cover lens covering the display window.

8. A head mounted display device, comprising a house and an optical glass, a telescope, an imaging lens assembly and a display screen arranged in the house, wherein, the house further comprises a display window and a view window, the telescope is arranged corresponding to the view window; the optical glass and the telescope are collocated along a first optical axis, the imaging lens assembly and the display screen are collocated along a second optical axis; light emitted by the display screen passes through the imaging lens assembly and the optical glass, and projects out the house through the display window; or outside light passes through the view window and the telescope, and projects out the house through the display window; wherein the optical glass is a beam splitter, a surface of the optical glass close to the imaging lens assembly is coated with a spectroscopic film which has a reflection of 50% of visible spectrum and a transmission of another 50% of the visible spectrum, a surface of the optical glass away from the imaging lens assembly is coated with a visible spectrum antireflection film.

9. The head mounted display device according to claim 8, wherein, an angle between the optical glass and the second optical axis is 45°.

10. The head mounted display device according to claim 8, wherein, an angle between the first optical axis and the second optical axis is 90°.

11. The head mounted display device according to claim 8, wherein, an eyepiece of each telescope is arranged corresponding to one view window, outside light passes through the eyepiece of the telescope and passes through an objective lens and then projects out.

12. The head mounted display device according to claim 8, further comprises a shielding case shielding the view window, or a cover lens covering the display window.

* * * * *